United States Patent
Hirthe et al.

(10) Patent No.: US 8,410,207 B2
(45) Date of Patent: Apr. 2, 2013

(54) THERMOPLASTIC, POLYMERIC MATERIALS PROVIDING HIGH IR ABSORPTION, METHOD FOR THE PRODUCTION THEREOF, AND USE THEREOF

(75) Inventors: Bernd Hirthe, Tonisvorst (DE); Kirsten Föhr, Kamp-Lintford (DE); Thorsten Bier, Dulsburg (DE); Helke Sanger, Rheinberg (DE); Andrea Otremba, Moers (DE); Michael Wedler, Duisburg (DE)

(73) Assignee: Sachtleben Chemie GmbH, Duisburg (DE)

( * ) Notice: Subject to any disclaimer, the term of this patent is extended or adjusted under 35 U.S.C. 154(b) by 1123 days.

(21) Appl. No.: 10/580,124

(22) PCT Filed: Nov. 26, 2004

(86) PCT No.: PCT/EP2004/013441
§ 371 (c)(1),
(2), (4) Date: Jul. 18, 2006

(87) PCT Pub. No.: WO2005/052049
PCT Pub. Date: Jun. 9, 2005

(65) Prior Publication Data
US 2007/0155881 A1    Jul. 5, 2007

(30) Foreign Application Priority Data
Nov. 28, 2003    (DE) .................................. 103 56 334

(51) Int. Cl.
*C01B 15/16*    (2006.01)
*C08K 3/32*    (2006.01)
*C04B 14/00*    (2006.01)

(52) U.S. Cl. .......................... 524/417; 423/306; 106/480
(58) Field of Classification Search .................. 423/306; 524/417; 106/480
See application file for complete search history.

(56) References Cited

U.S. PATENT DOCUMENTS

| | | | | |
|---|---|---|---|---|
| 2,222,882 | A | * | 11/1940 | Shames ........................... 95/136 |
| 3,953,565 | A | * | 4/1976 | Mizutani et al. ............... 264/129 |
| 3,980,611 | A | * | 9/1976 | Anderson et al. ............. 523/220 |

(Continued)

FOREIGN PATENT DOCUMENTS

| | | | |
|---|---|---|---|
| DE | 19543803 A1 | * | 5/1997 |
| EP | 0 410 907 | | 1/1991 |

(Continued)

OTHER PUBLICATIONS

Sigma-Aldrich Product Description 344400: Copper(II) hydroxide phosphate.*

(Continued)

*Primary Examiner* — William Cheung
(74) *Attorney, Agent, or Firm* — Fulbright & Jaworski LLP

(57) ABSTRACT

Thermoplastic polymeric materials with high IR absorption are described, containing at least one inorganic metal phosphate of the general formula $Me_x(PO_4)_y(OH)_z$, wherein Me consists of one or more elements from the group Cu, Fe, Mn, Sb, Zn, Ti, Ni, Co, V, Mg, Bi, Be, Al, Ce, Ba, Sr, Na, K, Ge, Ga, Ca, Cr, In or Sn, and wherein x and y are whole numbers and $x=(1 \ldots 18)$, $y=(1 \ldots 12)$ and $z=(0.2 \ldots 10)$, and the inorganic metal phosphate may optionally also contain water of crystallization.

28 Claims, 4 Drawing Sheets

Absorption spectrum of $Cu_2PO_4OH$ in alkyd resin binder (concentration 1 g per l)

U.S. PATENT DOCUMENTS

| | | | |
|---|---|---|---|
| 4,153,465 A * | 5/1979 | Hund et al. | 106/14.25 |
| 4,408,004 A * | 10/1983 | Pengilly | 524/398 |
| 4,456,723 A | 6/1984 | Breitenfellner et al. | |
| 4,535,118 A | 8/1985 | Pengilly et al. | |
| 4,672,086 A | 6/1987 | Seiler et al. | |
| 4,981,897 A | 1/1991 | Kawai et al. | |
| 5,489,639 A * | 2/1996 | Faber et al. | 524/417 |
| 6,506,826 B1 * | 1/2003 | Aramaki et al. | 524/415 |
| 7,067,577 B2 * | 6/2006 | Aramaki et al. | 524/417 |
| 2002/0111409 A1 | 8/2002 | Talibuddin | |
| 2003/0191223 A1 * | 10/2003 | Waterkamp et al. | 524/431 |
| 2007/0295689 A1 * | 12/2007 | Clauss et al. | 216/65 |
| 2010/0075848 A1 * | 3/2010 | Khan et al. | 503/201 |

FOREIGN PATENT DOCUMENTS

| | | |
|---|---|---|
| EP | 0 414 944 | 3/1991 |
| EP | 0 604 074 | 6/1994 |
| EP | 604074 A1 * | 6/1994 |

OTHER PUBLICATIONS

GE Plastics Product Description: VALOX® 325C.*

Machine translation of DE 19543803 A1.*

Martens, W., Frost, R.L. American Mineralogist, vol. 88, p. 37-46, Jan 2003.*

American Mineralogist Table of Contents.*

Anthony, J.W. et al. Handbook of Minerology. Mineralogical Society of America, 2001.*

* cited by examiner

Absorption spectrum of $Cu_2PO_4OH$ in alkyd resin binder (concentration 1 g per l)

Energy take-up of polyester (PET) compared with the energy radiated by an IR lamp.

1. Emission of an IR lamp with a radiation temperature of 2450 K

2. PET without IR absorber

3. PET with 15 ppm (0.0015 wt.%) of carbon black IR absorber (prior art)

4. PET with 100 ppm (0.01 wt.%) of $Cu_2PO_4(OH)$

Figure 3: X-ray diffractogram of $Cu_2PO_4OH$, prepared according to Example 1
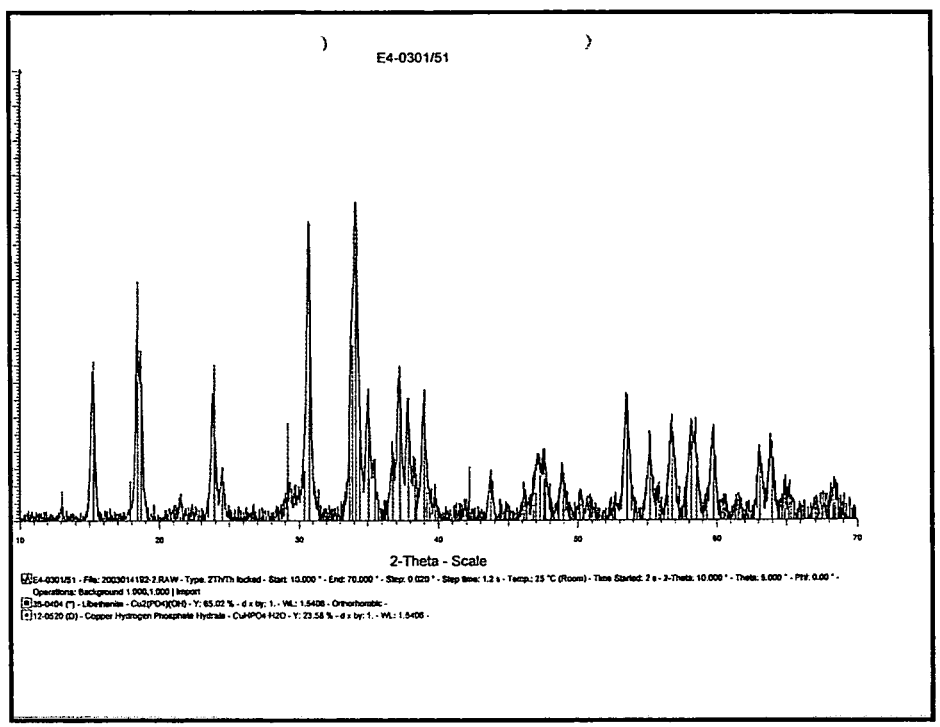

Figure 4: X-ray diffractogram of $Cu_2PO_4OH$, prepared according to Example 2:
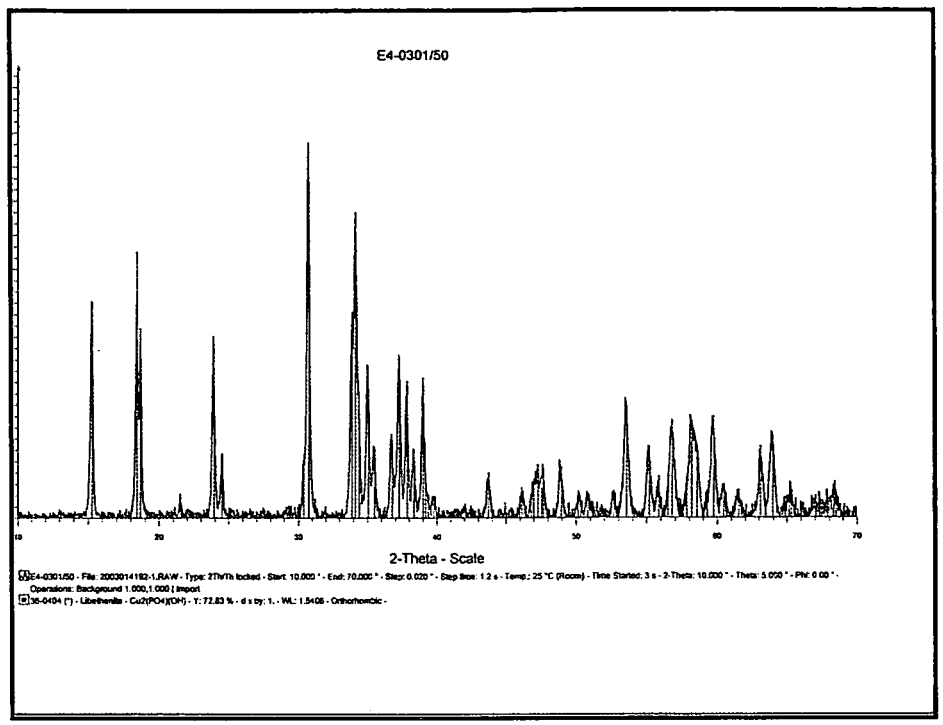

THERMOPLASTIC, POLYMERIC MATERIALS PROVIDING HIGH IR ABSORPTION, METHOD FOR THE PRODUCTION THEREOF, AND USE THEREOF

This is a §371 of PCT/EP2004/013441 filed Nov. 26, 2004 which claims priority from German Patent Application No. 103 56 334. 2 filed Nov. 28, 2003.

The invention relates to thermoplastic polymeric materials with high IR absorption, to a method for their preparation and to their use.

In order to bring thermoplastic polymeric materials (for example polyesters, such as polyethylene terephthalate (PET)) into their intended shape, the materials are often heated so that they soften and therefore become shapeable.

An example which may be mentioned is the known use of PET compositions as packaging material in the form of films, bottles and other container shapes. In order to form PET bottles, the polymer is conventionally added to the process in a granulated form. The granules ("PET chips") are first melted in extruders and processed by injection moulding methods to form so-called preforms. In another method step, these preforms are brought into the final bottle shape by the stretch-blow method. In order to be able to carry out plastic deformation of the preform to create a usefuble bottle, it is necessary to heat the preform to a temperature above the glass transition point and below the melting point of the polyester. For PET, the heating is typically carried out to a temperature of 105° C. The heating may, for example, be carried out by exposing the preforms to the light from a black radiator (radiator temperature 500° K to 3000° K, for example from commercially available quartz IR radiators). But polyester polymers, for example, absorb only in a few particular wavelength ranges of the IR spectrum, and therefore take up only a little of the available energy.

U.S. Pat. No. 6,197,851 proposes that in order to produce bottles according to the stretch-blow method, a polymer should be supplemented with at least one organic or organometallic compound that absorbs light in the wavelength range of from 700 to 1200 nm at least twice as strongly as in the wavelength range of from 400 to 700 nm. This is intended to increase the absorption capacity and therefore the energy take-up of the polymer for NIR and IR radiation. A disadvantage with the indicated organic compounds is that they are relatively difficult to prepare, and are therefore expensive.

U.S. Pat. Nos. 4,408,004 and 4,535,118 mention graphite or carbon black as a suitable absorptive additive, with the additional requirement that the particle size and the maximum amount added should be kept in a tightly controlled range in order to maintain a satisfactory optical clarity of the resulting bottles, or to avoid causing any unacceptable grey colouration. Carbon Black, however, has a higher absorption in the visible wavelength range than in the range of from 700 to 1500 nm, which is disadvantageous for the maximum amount which can be added in terms of the colouration.

It is an object of the invention to overcome the disadvantages of the prior art and, in particular, to provide thermoplastic polymeric materials which can be heated by exposure to NIR and/or IR light in a straightforward and economical way so that further processing is possible in order to shape them.

The object is achieved by thermoplastic polymeric materials with high IR absorption, containing at least one inorganic metal phosphate of the general formula $Me_x(PO_4)_y(OH)_z$, wherein Me consists of one or more elements from the group Cu, Fe, Mn, Sb, Zn, Ti, Ni, Co, V, Mg, Bi, Be, Al, Ce, Ba, Sr, Na, K, Ge, Ga, Ca, Cr, In or Sn, and wherein x and y are whole numbers and x=(1 ... 18), y=(1 ... 12) and z=(0.2 ... 10), and the inorganic metal phosphate may optionally also contain water of crystallisation.

It has been found that such thermoplastic polymeric materials have a high IR absorption without adding organic or metalorganic substances to the polymers. Surprisingly, the purely inorganic and relatively easily preparable compounds, or easily obtainable minerals of the indicated general formula $Me_x(PO_4)_y(OH)_z$, are capable of inducing a high IR absorption in the polymers. Here, the term "high" IR absorption is intended to mean that the transparency in the visible wavelength range of from 400 to 700 nm is not significantly impaired and the absorption in the wavelength range of from 700 to 1500 nm is significantly higher than in the visible range; for example, the absorption by such a polymer at a wavelength of 1100 nm is at least twice as great as the absorption at 600 nm.

The following may be used as thermoplastic polymeric materials: polyesters (such as polyethylene terephthalate (PET), polytrimethylene terephthalate (PTT), polybutylene terephthalate (PBT), polyethylene naphthalate (PEN)), polyalkylenes (such as polyethylene (PE), polypropylene (PP)), vinyl polymers (such as polyvinyl chloride (PVC)), polyamides, polyacetals, polyacrylates (such as polymethyl methacrylate (PMMA)), polycarbonates, polystyrenes, polyurethanes, acrylonitrile-butadiene-styrene copolymers (ABS), halogenated polyalkylenes, polyarylene oxides or polyarylene sulfides.

In the above formula, x, y and z preferably have the following values: x=(1 ... 5), y=(1 ... 4) and z=(0.2 ... 5). Phosphate compounds with the Dana classifications VII-41 and VII-42 may be used as inorganic metal phosphates with the general formula $Me_x(PO_4)_y(OH)_z$. The Dana classification is described in: Dana's New Mineralogy, Eighth Edition, by Richard V. Gaines, H. Catherine Skinner, Eugene E. Foord, Brian Mason and Abraham Rosenzweig, with sections by Vandall T. King, Illustrations by Eric Dowty, (ISBN: 047119310-0) Copyright © 1997, John Wiley & Sons, Inc.

The inorganic metal phosphates preferably contain one or more of the elements Cu, Fe and Al. The following are preferably used as inorganic metal phosphates with the general formula $Me_x(PO_4)_y(OH)_z$: $Cu_2PO_4OH$, $Cu_3(PO_4)(OH)_3$, $Cu_3(PO_4)(OH)_3$, $Cu_5(PO_4)_2(OH)_4$, $CuFe_2(PO_4)_2(OH)_2$, $(Cu,Zn)_2ZnPO_4(OH)_3.2(H_2O)$, $(Cu,Zn)_5Zn(PO_4)_2(OH)_6.(H_2O)$, $Cu_3Al_4(PO_4)_3(OH)_9.4(H_2O)$, $CuAl_3(PO_4)_4(OH)_3.4(H_2O)$, $(Zn,Cu)Al_6(PO_4)_4(OH)_8.4(H_2O)$, $CuFe_6(PO_4)_4(OH)_8.4(H_2O)$, $CaCu_6[(PO_4)_2(PO_3OH)(OH)_6].3(H_2O)$ or $Cu_2Mg_2(PO_4)_2(OH)_2.5(H_2O)$.

The amount of inorganic metal phosphates added is dictated by the absorption of the polymer prepared from them in the range of from 400 to 700 nm (the transparency should be impaired as little as possible) and the absorption in the range of from 700 to 1500 nm (the higher the absorption, the lower the amount added), and should be determined in preliminary tests where appropriate. In general, depending on the material thickness and acceptable colour changes (these depend on the particular application), suitable added amounts have been found to be from 0.0002 to 2 wt. % of inorganic metal phosphate, expressed in terms of the final thermoplastic polymeric material. A preferred added amount is in the range of from 0.001 to 0.1 wt. %.

If the inorganic metal phosphates are used in the form of naturally occurring minerals, these will need to be ground down first. The inorganic metal phosphate preferably has (Scherrer) crystallite sizes of from 0.005 to 5 μm, particularly preferably from 0.001 to 2 μm.

In order to prepare the inorganic metal phosphates $Me_x(PO_4)_y(OH)_z$, solutions of the relevant metal ion or ions and a solution of the relevant $PO_4$ component in an aqueous medium are precipitated. The pH, temperature, rate of addition, concentration added and addition sequence should be adjusted in the known way according to the compound to be prepared. For example, corresponding solutions of the sulfates, chlorides, nitrates, hydroxides or oxides may be used as the metal ion solutions. Suitable solutions for the $PO_4$ component are, for example, phosphoric acid or its soluble salts (alkali metal or alkaline-earth metal phosphates). Furthermore, the products may be hydrothermally treated (heating the aqueous precipitate suspension to temperatures >100° C. at an elevated pressure) and/or heat treated in the dry state in order to form the desired compound.

The inorganic metal phosphates may be added to the polymer at various times during the thermoplastic production, that is to say before, during and after the polymerisation reaction. For polyester production, the inorganic metal phosphate is preferably added in the form of a suspension (for example in an inert solvent or a reaction partner). In the case of polyalkylene terephthalate synthesis, for example, a suspension of the inorganic metal phosphate in monoethylene glycol (or in propanediol or butanediol) may be added to the reaction at various times. For polyalkylene production in particular, it is also possible to add the inorganic metal phosphate in the form of a (separately prepared) highly concentrated compound during the melt compounding (for example before the extrusion to form granules or preforms).

The thermoplastic polymeric materials containing one or more inorganic metal phosphates may be used wherever thermoplastic polymeric materials are softened by heating with IR radiation and subsequently subjected to further processing in order to shape them. The materials according to the invention are used in particular for the production of preforms, which are heated by means of IR radiation and subsequently processed to form consumer articles (for example packaging). In the case of PET, the heating by IR radiation is typically carried out to temperatures of from 90 to 120° C., preferably from 100 to 110° C. For other thermoplastic polymers, heating temperatures at which the subsequent further processing to shape these polymers is technically feasible should be selected accordingly, as a function of the glass transition temperature and the melting temperature.

The subject-matter of the invention will be explained in more detail with reference to the following examples:

BRIEF DESCRIPTION OF THE FIGURES

FIGS. 3 and 4 show X-ray diffractogram of $Cu_2PO_4OH$ of examples 1 and 2 respectively.

EXAMPLE 1

Preparation of the Compound $Cu_2PO_4OH$ 100 g of $CuSO_4 \times 5\ H_2O$ were dissolved in approximately 400 ml of hot water (T=80±5° C.) and 105 g of $Na_3PO_4 \times 12\ H_2O$ in approximately 600 ml of hot water (T=80±5° C.). The Na phosphate solution was then added slowly and continuously to the Cu sulfate solution while stirring vigorously. Stirring was continued for 120 minutes at 80° C.

The product obtained was filtered off and washed to a filtrate conductivity <100 µS/cm. The filter cake was then dispersed in water in a dissolver and dried in a laboratory spray tower. The dried product had a well-formed crystal structure (see FIG. 3).

EXAMPLE 2

Preparation of the Compound $Cu_2PO_4OH$ (Hydrothermal)

100 g of $CuSO_4 \times 5\ H_2O$ were dissolved in approximately 400 ml of hot water (T=80±5° C.) and 105 g of $Na_3PO_4 \times 12\ H_2O$ in approximately 600 ml of hot water (T=80±5° C.). The Na phosphate solution was then added slowly and continuously to the Cu sulfate solution while stirring vigorously. Stirring was continued for 120 minutes at 80° C.

The precipitate suspension obtained was heated to a temperature of 180° C. in an autoclave for 2 hours, with the pressure being set at 10 bar. The product was then filtered off and washed to a filtrate conductivity <100 µS/cm, dispersed in water using a dissolver and dried in a laboratory spray tower. The product has a well-formed crystal structure (see FIG. 4).

EXAMPLE 3

Figure 1:
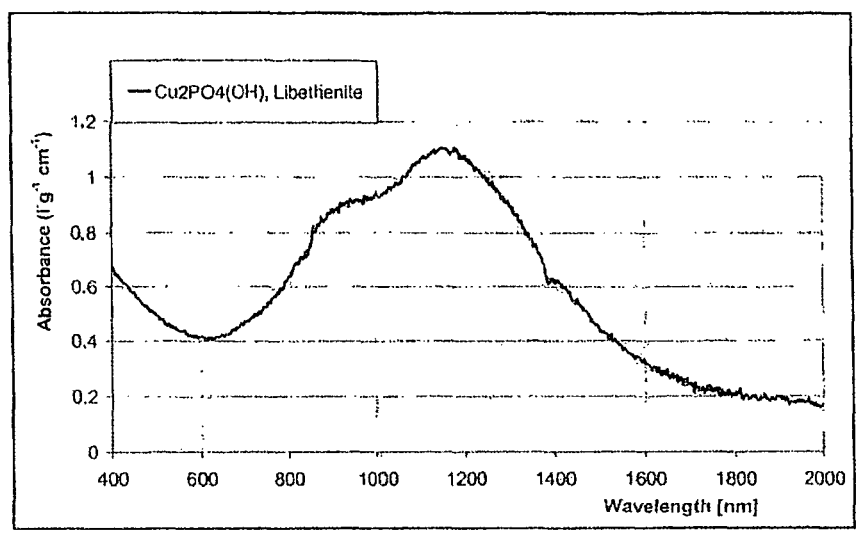
FIGS. 1 and 2 show the absorption characteristics of the samples containing $Cu_2PO_4OH$.

Absorption Spectrum of $Cu_2PO_4OH$ 1.0 g of the copper phosphate $Cu_2PO_4OH$ prepared in Example 1 was mixed with 1.0 l of an alkyd resin binder (DSM AD-9). An absorption spectrum of this mixture was recorded in the wavelength range of from 400 to 2000 nm (see FIG. 1). The spectrum shows that the metal phosphate according to the invention exhibits significantly increased absorption in the range of from 700 to 1600 nm relevant to IR radiation heating, with a maximum at 1150 nm.

EXAMPLE 4

Energy Take-up of $Cu_2PO_4OH$ in PET When Exposed to IR Radiators Compared to Pure PET and PET with Carbon Black The copper phosphate prepared in Example 1 was incorporated into polyethylene terephthalate by means of an extruder at a concentration of 0.01%, expressed in terms of the plastic. The melt was injection-moulded to form platelets with a layer thickness of 9 mm. Transmission spectra of the platelets were recorded in the range of from 400 to 1600 nm using a spectrometer.

Figure 2:
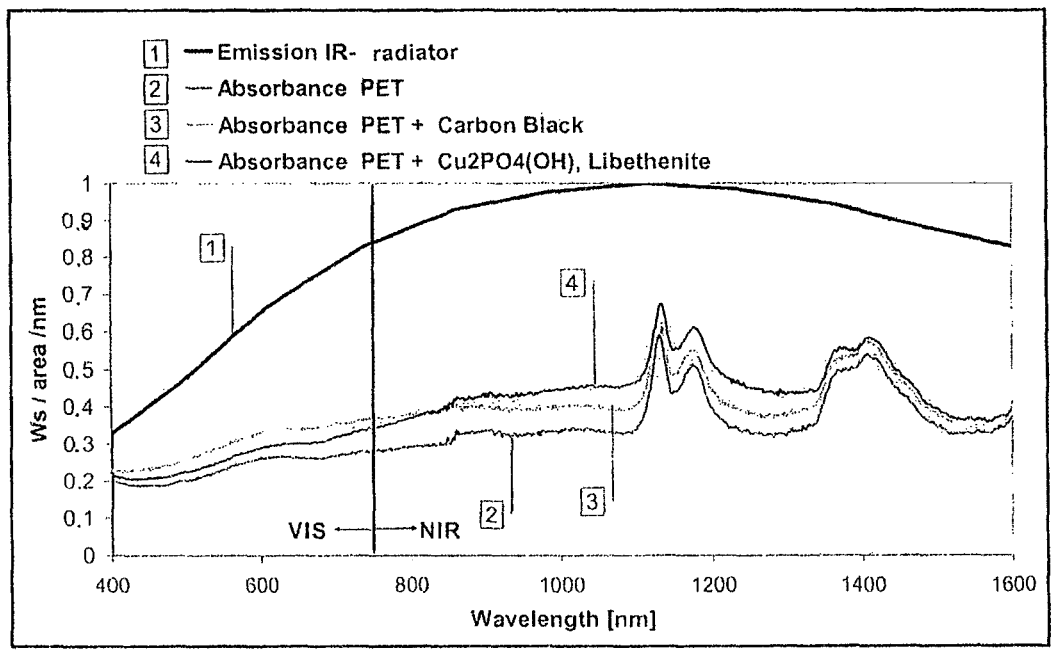

FIG. 2 shows, on the one hand, the energy put out by an IR lamp with a radiation temperature of 2450 K (Curve line 1) and, on the other hand, the corresponding wavelength-dependent energy take-up of various test platelets (Curves 2 to 4) when exposed to this radiation source. The formulation according to the invention (Curve 4) has a much lower absorption in the visible range (400 to 700 nm) and therefore less clouding or colouration potential than the comparative sample corresponding to the prior art (Curve 3). Nevertheless, the significantly increased radiation take-up of the formulation according to the invention in the NIR range (800 to 1600 nm), and therefore better energy efficiency in the heating process, can be seen compared to pure PET (Curve 2) and the comparative sample (Curve 3).

The invention claimed is:

1. A thermoplastic polymeric material comprising at least one inorganic metal phosphate of the formula having a Sherrer crystallite size of from 0.001 to less than or equal to 2 µm, $Me_x(PO_4)_y(OH)_z$, wherein Me is an element selected from the group consisting of Cu, Fe, Mn, Sb, Zn, Ti, Ni, Co, V, Mg, Bi, Be, Al, Ce, Ba, Sr, Na, K, Ge, Ga, Ca, Cr, In and Sn, wherein the inorganic metal phosphate optionally contains a water of crystallization, wherein x and y are whole numbers; and x is from 1 to 18;
y is from 1 to 1; and
z is from 0.2 to 10, wherein the thermoplastic material has a high infrared absorption such that the transparency in the visible wavelength range of from 400 to 700 nm is not significantly impaired and the absorption in the wavelength range of from 700 to 1500 nm is significantly higher than in the visible range, and wherein if the inorganic metal phosphate is $Ca_3(PO_4)_2Ca(OH)_2$ it contains a water of crystallization.

2. The thermoplastic polymeric material according to claim 1, comprising a plastic selected from the group consisting of a polyester, a polyalkylene, a vinyl polymer, a polyamide, a polyacetal, a polyacrylate, a polycarbonate, a polystyrene, a polyurethane, a acrylonitrile-butadiene-styrene copolymer, an halogenated polyalkylene, a polyarylene oxide and a polyarylene sulfide.

3. The thermoplastic polymeric material according to claim 2, wherein said plastic is selected from the group consisting of polyethylene-terephthalate (PET), polytrimethylene terephthalate (PTT), polybutylene-terephthalate (PBT), polyethylene naphthalate (PEN), polyethylene (PE), polypropylene (PP), polyvinyl chloride (PVC) and polymethyl methacrylate (PMMA).

4. The thermoplastic polymeric material according to claim 1, wherein
x is from 1 to 5;
y is from 1 to 4; and
z is from 0.2 to 5.

5. The thermoplastic polymeric, material according to claim 1, wherein said inorganic metal phosphate is selected from the group consisting of $Cu_2PO_4OH$, $Cu_3(PO_4)(OH)_3$, $Cu_5(PO_4)_2(OH)_4$, $CuFe_2(PO_4)_2(OH)_2$, $(Cu,Zn)_2ZnPO_4(OH)_3.2(H_2O)$, $(Cu,Zn)_5Zn(PO_4)_2(OH)_6.(H_2O)$, $Cu_3Al_4(PO_4)_3(OH)_9.4(H_2O)$, $CuAl_3(PO_4)_4(OH)_3.4(H_2O)$, $(Zn,Cu)Al_6(PO_4)_4(OH)_8.4(H_2O)$, $CuFe_6(PO_4)_4(OH)_8.4(H_2O)$, $CaCu_6[(PO_4)_2(PO_3OH)(OH)_6].3(H_2O)$ and $Cu_2Mg_2(PO_4)_2(OH)_2.5(H_2O)$.

6. The thermoplastic polymeric material according to claim 1, wherein the amount of inorganic metal phosphates added is from 0.0002 to 2 wt. %, expressed in terms of the final thermoplastic polymeric material.

7. The thermoplastic polymeric material according to claim 1, wherein the amount of inorganic metal phosphates added is from 0.001 to 0.1 wt. %, expressed in terms of the final thermoplastic polymeric material.

8. The thermoplastic polymeric material according to claim 1, wherein the inorganic metal phosphate has Scherrer crystallite sizes of 0.005 µm.

9. The thermoplastic polymeric material according to claim 1, wherein the inorganic metal phosphate has Scherrer crystallite sizes of 0.001 µm.

10. A method for the preparation of thermoplastic polymeric materials with high IR absorption, containing at least one inorganic metal phosphate of the formula $Me_x(PO_4)_y(OH)_z$, which may optionally contain a water of crystallization wherein a solution of the relevant metal ion, or the relevant metal ions, and a solution of the relevant $PO_4$ component in an aqueous medium are precipitated, the product obtained is dried and incorporated into a thermoplastic polymeric material, wherein if the inorganic metal phosphate is $Ca_3(PO_4)_2Ca(OH)_2$ it contains a water of crystallization, and wherein the inorganic metal phosphate has Scherrer crystallite sizes only of from 0.001 to 2 µm.

11. A method according to claim 10, wherein corresponding solutions of the sulfates, chlorides, nitrates, hydroxides or oxides are used as the metal ion solution.

12. A method according to claim 10, wherein phosphoric acid or solutions of its soluble salts are used as the solution for the $PO_4$ component.

13. A method according to claim 10, wherein the precipitation products are hydrothermally treated and/or heat treated in the dry state in order to form the desired metal phosphate.

14. A method comprising softening a thermoplastic polymeric material according to claim 1 by heating with IR radiation and subsequently subjected to further processing to shape them.

15. A method of producing a preform comprising a thermoplastic polymeric material of claim 1 by heating with IR radiation and subsequently processing to form a consumer article and packaging.

16. A thermoplastic polymeric material comprising a plastic and at least one inorganic metal phosphate selected from the group consisting of
$Ca_3(PO_4)_2Ca(OH)_2$;
$Cu_3(PO_4)(OH)_3$;
$Cu_5(PO_4)_2(OH)_4$;
$CuFe_2(PO_4)_2(OH)_2$;
$(Cu,Zn)_2ZnPO_4(OH)_3.2(H_2O)$;
$(Cu,Zn)_5Zn(PO_4)_2(OH)_6.(H_2O)$;
$Cu_3Al_4(PO_4)_3(OH)_9.4(H_2O)$;
$CuAl_3(PO_4)_4(OH)_3.4(H_2O)$;
$(Zn,Cu)Al_6(PO_4)_4(OH)_8.4(H_2O)$;
$CuFe_6(PO_4)_4(OH)_8.4(H_2O)$;
$CaCu_6[(PO_4)_2(PO_3OH)(OH)_6].3(H_2O)$; and
$Cu_2Mg_2(PO_4)_2(OH)_2.5(H_2O)$;
wherein the inorganic metal phosphate has Scherrer crystallite sizes only of from 0.001 to 2 µm.

17. The thermoplastic polymeric material according to claim 16, wherein said plastic is selected from the group consisting of a polyester, a polyalkylene, a vinyl polymer, a polyamide, a polyacetal, a polyacrylate, a polycarbonate, a polystyrene, a polyurethane, an acrylonitrile-butadiene-styrene copolymer, an halogenated polyalkylene, a polyarylene oxide and a polyarylene sulfide.

18. The thermoplastic polymeric material according to claim 17, wherein said plastic is selected from the group consisting of polyethylene-terephthalate, polytrimethylene terephthalate, polybutylene-terephthalate, polyethylene naphthalate, polyethylene, polypropylene, polyvinyl chloride and polymethyl methacrylate.

19. The thermoplastic polymeric material according to claim 16, wherein said inorganic, metal phosphate is selected from the group consisting of $Cu_5(PO_4)_2(OH)_4$, $CuFe_2(PO_4)_2(OH)_2$, $(Cu,Zn)_2ZnPO_4(OH)_3.2(H_2O)$, $(Cu,Zn)_5Zu(PO_4)_2(OH)_6.(H_2O)$, $CuAl_3(PO_4)_4(OH)_3.4(H_2O)$, $(Zn,Cu)Al_6(PO_4)_4(OH)_8.4(H_2O)$, $CuFe_6(PO_4)_4(OH)_8.4(H_2O)$, $CaCu_6[(PO_4)_2(PO_3OH)(OH)_6].3(H_2O)$ and $Cu_2Mg_2(PO_4)_2(O))_2.5(H_2O)$.

20. The thermoplastic polymeric material according to claim 16, wherein the amount of inorganic metal phosphates added is from 0.0002 to 2 wt. %, expressed in terms of the final thermoplastic polymeric material.

21. The thermoplastic polymeric material according to claim 16, wherein the amount of inorganic metal phosphates added is from 0.001 to 0.1 wt. %, expressed in terms of the final thermoplastic polymeric material.

22. The thermoplastic polymeric material according to claim 16, wherein the inorganic metal phosphate has Scherrer crystallite sizes of 0.005 µm.

23. The thermoplastic polymeric material according to claim 16, wherein the inorganic metal phosphate has Scherrer crystallite sizes of 0.001 µm.

24. The thermoplastic polymeric material according to claim 16, wherein the thermoplastic material has a high infrared absorption such that the transparency in the visible wavelength range of from 400 to 700 nm is not significantly impaired and the absorption in the wavelength range of from 700 to 1500 nm is significantly higher than in the visible range.

25. The thermoplastic polymeric material according to claim 16, wherein said inorganic metal phosphate is selected from the group consisting of $CuFe_2(PO_4)_2(OH)_2$, $(Cu,Zn)_2ZnPO_4(OH)_3 \cdot 2(H_2O)$, $(Cu,Zn)_5Zn(PO_4)_2(OH)_6 \cdot (H_2O)$, $Cu_3Al_4(PO_4)_3(OH)_9 \cdot 4(H_2O)$, $CuAl_3(PO_4)_4(OH)_3 \cdot 4(H_2O)$, $(Zn,Cu)Al_6(PO_4)_4(OH)_8 \cdot 4(H_2O)$, $CuFe_6(PO_4)_4(OH)_8 \cdot 4(H_2O)$, $CaCu_6[(PO_4)_2(PO_3OH)(OH)_6] \cdot 3(H_2O)$ and $Cu_2Mg_2(PO_4)_2(OH)_2 \cdot 5(H_2O)$.

26. The thermoplastic polymeric material according to claim 1, wherein said inorganic metal phosphate is selected from the group consisting of $CuFe_2(PO_4)_2(OH)_2$, $(Cu,Zn)_2ZnPO_4(OH)_3 \cdot 2(H_2O)$, $(Cu,Zn)_5Zn(PO_4)_2(OH)_6 \cdot (H_2O)$, $Cu_3Al_4(PO_4)_3(OH)_9 \cdot 4(H_2O)$, $CuAl_3(PO_4)_4(OH)_3 \cdot 4(H_2O)$, $(Zn,Cu)Al_6(PO_4)_4(OH)_8 \cdot 4(H_2O)$, $CuFe_6(PO_4)_4(OH)_8 \cdot 4(H_2O)$, $CaCu_6[(PO_4)_2(PO_3OH)(OH)_6] \cdot 3(H_2O)$ and $Cu_2Mg_2(PO_4)_2(OH)_2 \cdot 5(H_2O)$.

27. A thermoplastic polymeric material comprising at least one inorganic metal phosphate of the formula $Me_x(PO_4)_y(OH)_z$, wherein Me consists of one or more elements from the group Cu, Fe, Mn, Sb, Zn, Ti, Ni, Co, V, Mg, Bi, Be, Al, Ce, Ba, Sr, Na, K, Ge, Ga, Ca, Cr, In or Sn, wherein the inorganic metal phosphate optionally contains a water of crystallization, wherein x and y are whole numbers; and x is from 1 to 18;
y is from 1 to 12; and
z is from 0.2 to 10;

wherein the inorganic metal phosphate is $Ca_3(PO_4)_2Ca(OH)_2$ and contains a water of crystallization;

wherein the thermoplastic material has a high infrared absorption such that the transparency in the visible wavelength range of from 400 to 700 nm is not significantly impaired and the absorption in the wavelength range of from 700 to 1500 nm is significantly higher than in the visible range, and wherein the inorganic metal phosphate has Scherrer crystallite sizes ranging from 0.001 to less than or equal to 2 µm.

28. A method for the preparation of thermoplastic polymeric materials with high IR absorption, containing at least one inorganic metal phosphate of the formula $Me_x(PO_4)_y(OH)_z$, which may optionally contain a water of crystallization wherein a solution of the relevant metal ion, or the relevant metal ions, and a solution of the relevant $PO_4$ component in an aqueous medium are precipitated, the product obtained is dried and incorporated into a thermoplastic polymeric material, wherein the inorganic metal phosphate is $Ca_3(PO_4)_2Ca(OH)_2$ and contains a water of crystallization; and wherein the inorganic metal phosphate has Scherrer crystallite sizes ranging from 0.001 to less than or equal to 2 µm.

\* \* \* \* \*